(12) United States Patent
Chen et al.

(10) Patent No.: US 12,204,934 B2
(45) Date of Patent: Jan. 21, 2025

(54) METHOD, DEVICE, AND PROGRAM PRODUCT FOR MANAGING MULTIPLE COMPUTING TASKS BASED ON BATCH

(71) Applicant: EMC IP Holding Company LLC, Hopkinton, MA (US)

(72) Inventors: Tao Chen, Beijing (CN); Bing Liu, Tianjin (CN); Qi Chen, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 748 days.

(21) Appl. No.: 17/388,644

(22) Filed: Jul. 29, 2021

(65) Prior Publication Data

US 2022/0413906 A1  Dec. 29, 2022

(30) Foreign Application Priority Data

Jun. 24, 2021  (CN) .......................... 202110706189.6

(51) Int. Cl.
*G06F 9/46* (2006.01)
*G06F 9/48* (2006.01)

(52) U.S. Cl.
CPC ............ *G06F 9/4881* (2013.01); *G06F 9/466* (2013.01)

(58) Field of Classification Search
CPC .............................. G06F 9/4881; G06F 9/466
See application file for complete search history.

(56) References Cited

U.S. PATENT DOCUMENTS

| | | | | |
|---|---|---|---|---|
| 2008/0256541 | A1* | 10/2008 | Rai ....................... | G06F 3/1262 718/101 |
| 2022/0206975 | A1* | 6/2022 | Gopal ..................... | H03M 7/60 |
| 2023/0327963 | A1* | 10/2023 | Khermosh ............ | G06F 9/5038 709/224 |
| 2024/0004776 | A1* | 1/2024 | Ogras ................. | G06F 11/3414 |

* cited by examiner

*Primary Examiner* — Tammy E Lee
(74) *Attorney, Agent, or Firm* — WOMBLE BOND DICKINSON (US) LLP (57) ABSTRACT

The present disclosure relates to a method, a device, and a program product for managing multiple computing tasks on a batch basis. A method includes: identifying a task type of the multiple computing tasks in response to receiving a request to use a computing unit in a computing system to perform the multiple computing tasks; acquiring a scheduling time overhead incurred for scheduling the multiple computing tasks for execution by the computing unit; determining, based on the task type and the scheduling time overhead, a batch size for dividing the multiple computing tasks; and dividing the multiple computing tasks into at least one batch based on the batch size. A corresponding device and a corresponding computer program product are provided. With the example implementations of the present disclosure, the batch size for dividing multiple computing tasks can be dynamically determined, so that the performance of the computing system can meet user demands.

20 Claims, 7 Drawing Sheets

METHOD, DEVICE, AND PROGRAM PRODUCT FOR MANAGING MULTIPLE COMPUTING TASKS BASED ON BATCH

CROSS-REFERENCE TO RELATED APPLICATION

This patent application claims priority, under 35 U.S.C. § 119, of Chinese Patent Application No. 202110706189.6, filed Jun. 24, 2021, which is incorporated by reference in its entirety.

TECHNICAL FIELD

Implementations of the present disclosure relate to managing computing tasks and, more specifically, to a method, a device, and a computer program product for managing multiple computing tasks on a batch basis.

BACKGROUND

With the development of computer technology, computing systems can include many types of computing units. These computing units can process each computing task one by one and/or process multiple computing tasks in batches. Due to limitations of both bandwidth resources and computational resources of computing units, it has become a hot research topic to utilize computing units more fully to process multiple computing tasks.

SUMMARY OF THE INVENTION

Therefore, it is desirable to develop and implement a technical solution to manage computing tasks in a more efficient manner. This technical solution is expected to be compatible with the existing computing systems and to manage computing tasks in a more convenient and efficient manner.

According to a first aspect of the present disclosure, a method for managing multiple computing tasks on a batch basis is provided. This method includes: identifying a task type of the multiple computing tasks in response to receiving a request to use a computing unit in a computing system to perform the multiple computing tasks; acquiring a scheduling time overhead incurred for scheduling the multiple computing tasks for execution by the computing unit; determining, based on the task type and the scheduling time overhead, a batch size for dividing the multiple computing tasks; and dividing the multiple computing tasks into at least one batch based on the batch size.

According to a second aspect of the present disclosure, an electronic device is provided, including: at least one processor; a volatile memory; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and containing machine-executable instructions for performing the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of examples rather than limitation. In the accompanying drawings, FIG. 1 schematically illustrates a block diagram of an application environment in which example implementations of the present disclosure may be implemented.

DETAILED DESCRIPTION

Preferred implementations of the present disclosure will now be described in more detail below with reference to the accompanying drawings. Although the preferred implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one exemplary embodiment" and "one embodiment" mean "at least one exemplary embodiment." The term "another implementation" means "at least one additional implementation." The terms "first," "second," and the like may refer to different or identical objects. Other explicit and implicit definitions may also be included below.

Figure 1:
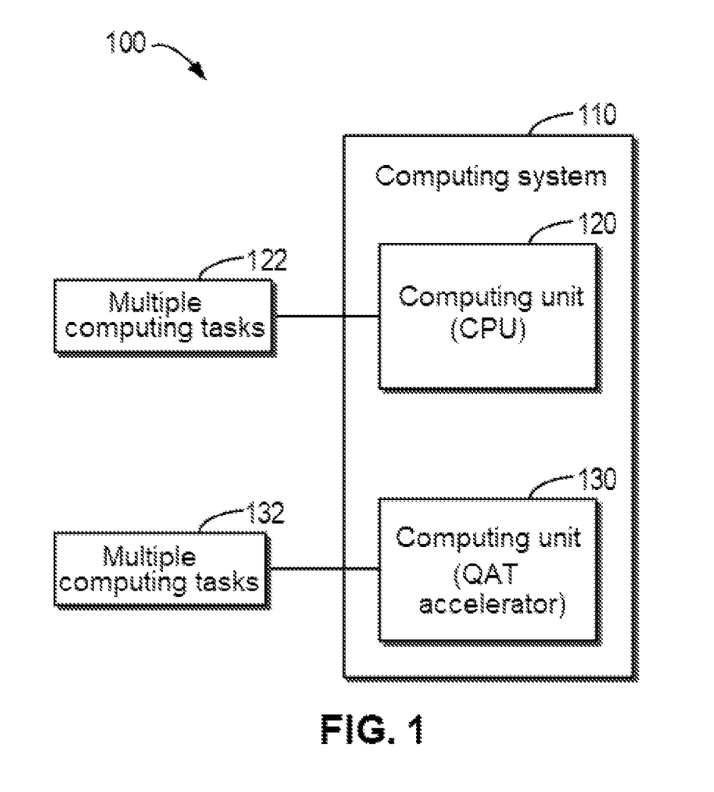

For ease of description, an application environment will be first described with reference to FIG. 1. FIG. 1 schematically illustrates a block diagram of application environment 100 in which example implementations of the present disclosure may be implemented. As shown in FIG. 1, computing system 110 may include computing unit 120 (e.g., a central processing unit (CPU)) and computing unit 130 (e.g., a Quick Assist Technology (QAT) accelerator). QAT is a technology that has been proposed based on dedicated hardware accelerators, and this technology can process certain types of computing tasks and thus share the workload of the CPU.

However, an additional scheduling time overhead is required to schedule a computing task so that it can be performed by the QAT accelerator. For example, in order to use the QAT accelerator to perform a computing task, it is necessary that data to be processed for the computing task be input to a specified address, the QAT accelerator perform a polling as to whether data to be processed exists, and the QAT accelerator perform the computing task, output a processing result to the specified address, notify the worker thread to fetch the processing result, and so on. In the total processing time of the above process, the entire time overhead other than that for the QAT accelerator performing the computing tasks can be referred to as the scheduling time overhead. It will be understood that the scheduling time overhead may take a large percentage of the total processing time, which results in undesirable overall computing performance of computing system 110.

Figure 2A:
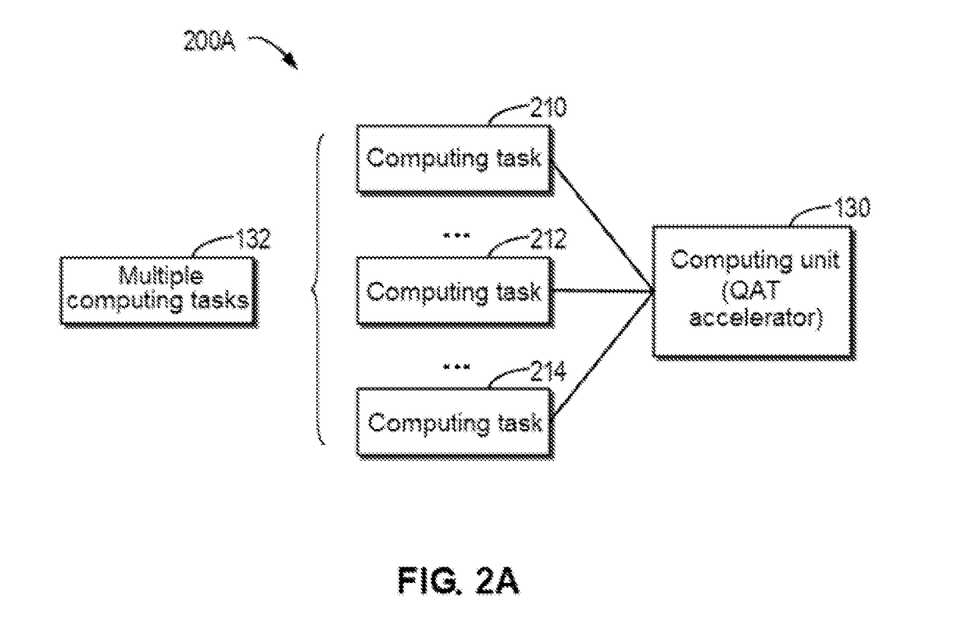
FIG. 2A schematically illustrates a block diagram for managing computing tasks based on a single-task mode according to an example implementation of the present disclosure.
Figure 2B:
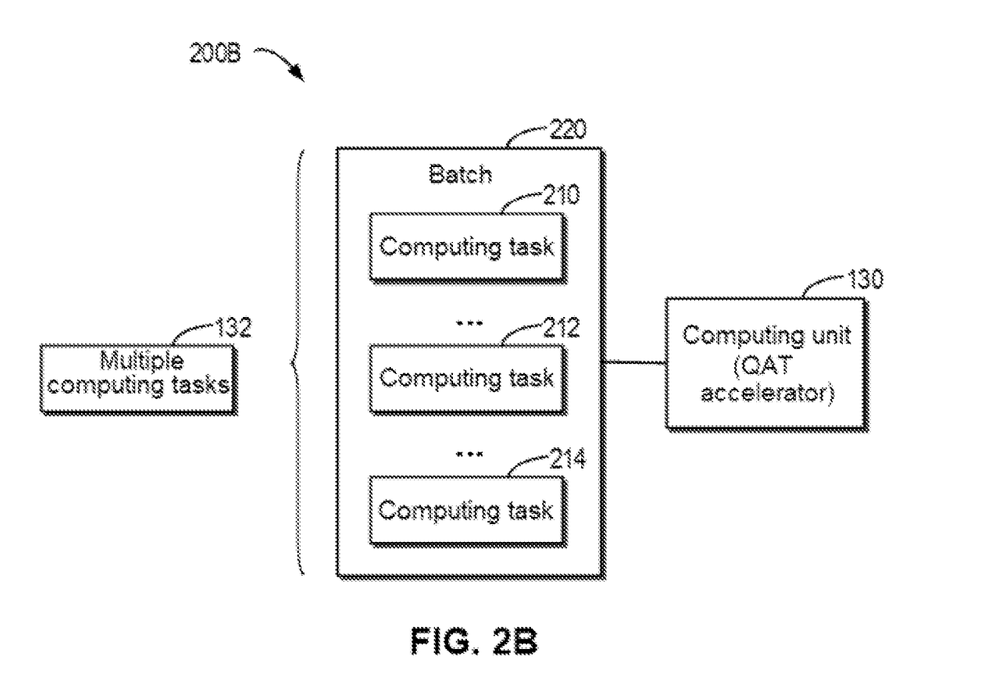
FIG. 2B schematically illustrates a block diagram for managing computing tasks based on a batch-processing mode according to an example implementation of the present disclosure.

Hereinafter, the working process of the QAT accelerator will be described with reference to FIG. 2A and FIG. 2B. FIG. 2A schematically illustrates block diagram 200A for managing computing tasks based on a single-task mode according to an example implementation of the present disclosure. As shown in FIG. 2A, each computing task 210, . . . , 212, . . . , and 214 of multiple computing tasks 132 can be input to computing unit 130 one by one. At this point, computing unit 130 will perform each computing task 210, . . . , 212, . . . , and 214 in turn, in accordance with the process described above. Thus, the scheduling time overhead for the multiple computing tasks 132 will include the time overhead of performing the steps of inputting, polling, outputting, notification, etc. for each computing task. Although the single-processing mode can readily process a single computing task and reduce the response latency of the single computing task, however, the overall scheduling time for processing the multiple computing tasks 132 is high, which results in lower data throughput of computing unit 130.

Technical solutions for batch processing have been proposed, for example, the QAT accelerator supports batch working mode. Specifically, multiple computing tasks can be wrapped into one data packet and the data packet can be committed to the QAT accelerator for processing. FIG. 2B schematically illustrates block diagram 200B for managing computing tasks based on a batch-processing mode according to an example implementation of the present disclosure. As shown in FIG. 2, computing tasks 210, . . . , 212, . . . , and 214 can be wrapped into batch 220, and then all of the computing tasks in batch 220 are committed to computing unit 130 in a commit process. In this case, the inputting, polling, outputting, and notification steps are performed for a single batch 220, and the overall scheduling time overhead of processing multiple computing tasks can thereby be reduced. Although the batch-processing mode can improve the overall data throughput of computing unit 130, however, the response latency of each computing tasks is high. For example, a user that commits computing task 210 has to wait until the last computing task 214 is processed to get the processing result of computing task 210.

Thus, it would be desirable that a solution can be provided to process computing tasks in a more efficient manner, and it would be desirable that this technical solution can process computing tasks with higher performance in accordance with demands of different users.

In order to at least partially eliminate the deficiencies in the above technical solutions, a method for managing multiple computing tasks on a batch basis is provided according to an example implementation of the present disclosure.

Figure 3:
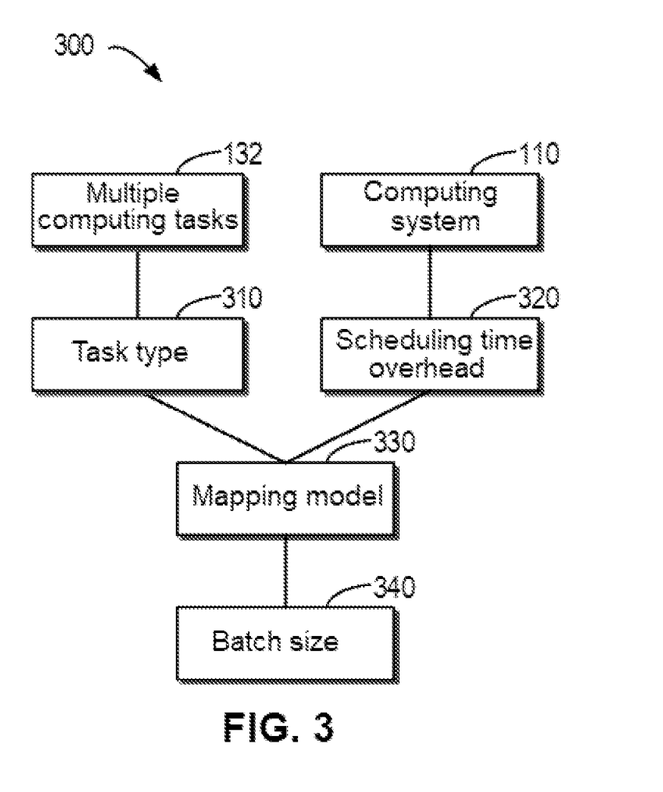
FIG. 3 schematically illustrates a block diagram of a process for managing computing tasks according to an example implementation of the present disclosure.

Hereinafter, an overview of an example implementation according to the present disclosure will be described with reference to FIG. 3. FIG. 3 schematically illustrates a block diagram of process 300 for managing computing tasks according to an example implementation of the present disclosure. As shown in FIG. 3, task type 310 of the received multiple computing tasks 132 can be identified, and scheduling time overhead 320 for scheduling the multiple computing tasks 132 for execution by computing unit 130 can be acquired. Task type 310 and scheduling time overhead 320 can be input to mapping model 330 to determine batch size 340 used to divide the multiple computing tasks 132. Further, the multiple computing tasks can be divided into at least one batch based on batch size 340 so that one or more computing tasks in each batch are processed by computing unit 130.

With the example implementation of the present disclosure, batch size 340 can be dynamically adjusted based on the current scheduling time overhead 320 to balance the response latency and data throughput of computing system 110 in order to improve the overall performance of the computing system and make the process to better meet user demands.

Figure 4:
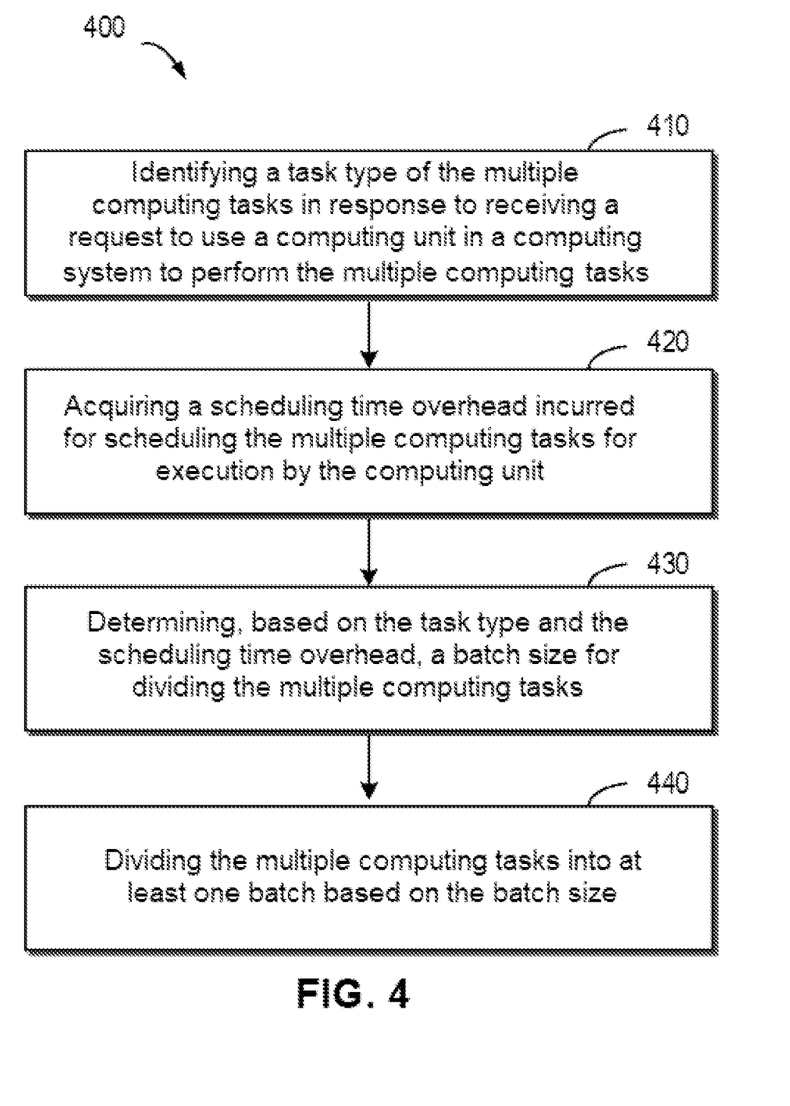
FIG. 4 schematically illustrates a flow chart of a method for managing computing tasks according to an example implementation of the present disclosure.

Hereinafter, more details of an example implementation according to the present disclosure will be provided with reference to FIG. 4. FIG. 4 schematically illustrates a flow chart of method 400 for managing computing tasks according to an example implementation of the present disclosure. Method 400 can be executed in computing system 110, where the computing tasks may include, for example, computing tasks performed by at least any one of the QAT accelerator as well as the CPU.

At block 410, in response to receiving a request to use computing unit 130 in computing system 110 to perform the multiple computing tasks 132, task type 310 of the multiple computing tasks 132 is identified. According to an example implementation of the present disclosure, computing system 110 may include a data protection system. It will be understood that the data protection system can involve a large number of computing tasks, such as compression tasks, decompression tasks, encryption tasks, decryption tasks, hash tasks, backup tasks, and replication tasks, and so on. The computational complexity of these computing tasks is usually low and the volume is large, making them particularly suitable for processing with QAT accelerators. Using the method according to the present disclosure in a data protection system, a large amount of tedious repetitive workload can be offloaded from the CPU to the QAT accelerator, thereby relieving the CPU of workload and thus allowing the CPU to prioritize more complex computing tasks.

According to an example implementation of the present disclosure, task type 310 can be identified based on at least any one of the following: throughput and response latency requirements for the multiple computing tasks. It will be understood that users do not have the same demands for different computing tasks. For example, a user wants to process some computing task(s) as quickly as possible (i.e., a low response latency is required). For another example, another user wants to process a large amount of computing tasks in a short time (i.e., a high data throughput is required). Thus, the task type of the computing task can be identified based on both response latency and data throughput.

In general, it can be assumed that computing tasks with low concurrency require lower response latency and are not sensitive to data throughput. For example, a backup task is used to back up data between a user system and a data protection system in order to back up the user's fresh data to the data protection system, and the backup task can be performed at the file level and the files are independent of each other. In this case, multiple backup tasks involving multiple files are executed sequentially (for example, this can be implemented using single-threading techniques). To avoid data loss, each backup task is expected to be completed as quickly as possible. For another example, computing tasks with high concurrency can be considered to require large data throughput and are not sensitive to response latency. For example, replication tasks performed within a data protection system can often be performed concurrently, which, for example, can be implemented using multi-threading techniques. At this point, the purpose of the replication task is to complete the backup of a large amount of data in a relatively short period of time. According to an example implementation of the present disclosure, task types can be classified into the following types: a type requiring lower response latency and a type requiring higher data throughput.

According to an example implementation of the present disclosure, the type of each computing task can be pre-tagged. For example, a type field can be added to the description of the request and/or computing task so that the task type of each computing task can be quickly determined. Specifically, the type field can be set to 0 to indicate that the computing task requires a low response latency; and the type field can be set to 1 to indicate that the computing task requires a high data throughput.

According to an example implementation of the present disclosure, the type of a computing task can be identified based on a requester of a computing task. For example, computing tasks involved in requests from user systems can be identified as requiring low response latency, and computing tasks involved in requests from within the data protection system can be identified as requiring high data throughput. It will be understood that the above only schematically illustrates specific examples for identifying task types and that in other application environments, task types can be identified in other manners. For example, a third task type may exist and that type specifies that both response latency and data throughput should be balanced. With the example implementation of the present disclosure, multiple computing tasks can be managed based on requirements of different users for both response latency and data throughput. In this way, the performance of the computing system can be improved and thus user satisfaction can be increased.

At block 420, scheduling time overhead 320 incurred for scheduling the multiple computing tasks 132 for execution by computing unit 130 can be acquired. According to an example implementation of the present disclosure, scheduling time overhead 320 can be acquired based on the operating state of computing system 110. For example, the scheduling time overhead can be counted based on the operating history of computing system 110 in previous time periods. Specifically, scheduling time overhead 320 can be determined based on a difference between the length of time from committing of the computing task to obtaining of a processing result and the length of time in which the computing task is actually performed by the computing unit. It will be understood that scheduling time overhead 320 will change as the working state of the computing system changes, and thus the scheduling time overhead can be determined periodically so that subsequent scheduling policies conform to the current state of the computing system.

At block 430, based on task type 310 and scheduling time overhead 320, a batch size for dividing the multiple computing tasks is determined. According to an example implementation of the present disclosure, mapping model 330 corresponding to task type 310 can be acquired first. Here, mapping model 330 describes an association relationship between the task type, the scheduling time overhead of the computing unit, and the batch size of the multiple computing tasks. According to an example implementation of the present disclosure, the batch size can be expressed in a variety of ways: the batch size can be expressed in units of data volume, e.g., 16, 32, 64 KB, and so on; and the batch size can be expressed in terms of the number of computing tasks, e.g., 16, 32, 64, etc. Mapping model 330 may, for example, be stored in a tabular format, such as Table 1 below, which illustrates an example data structure for the mapping model.

TABLE 1

Examples of mapping model

| | Scheduling time overhead (μs) | | | | | | |
|---|---|---|---|---|---|---|---|
| | 0 | 200 | 400 | 600 | 800 | 1000 | 1200 |
| Batch size 1 (KB) (For mapping model 1) | 0 | 80 | 100 | 110 | 120 | 124 | 128 |
| Batch size 2 (KB) (For mapping model 2) | 0 | 0 | 0 | 8 | 32 | 64 | 128 |

Table 1 shows the batch sizes 1 and 2 for mapping models 1 and 2, respectively, where mapping models 1 and 2 are mapping models associated with different types of computing tasks, respectively. For example, mapping model 1 is associated with computing tasks that require high data throughput. As shown in the second row of Table 1, batch size 1 for distribution type 1 increases rapidly as the scheduling time overhead increases, thus providing high data throughput. When the scheduling time overhead is between 0 and 200 μs, the batch size is 0, which means that no wrapping is performed but each computing task is processed individually. When the scheduling time overhead is greater than 200 μs, operations based on the batch-processing mode begin: for example, the batch size is 100 KB when the scheduling time overhead is 400 μs;

and for another example, as shown in the third row of Table 1, mapping model 2 is associated with computing tasks that require low response latencies. Batch size 2 for distribution type 2 increases slowly as the scheduling time overhead increases, and when the scheduling time overhead is below 400 μs, no packaging is performed but each computing task is processed individually. In this case, each computing task can be processed quickly, and thus a low response latency can be obtained.

Figure 5:
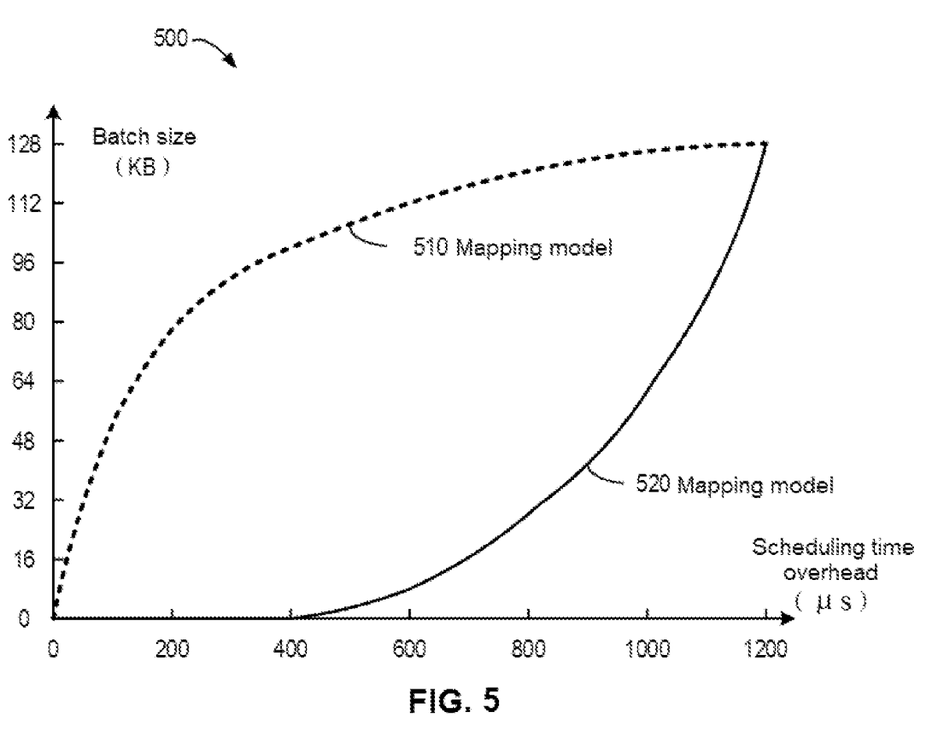
FIG. 5 schematically illustrates a block diagram of a mapping model according to an example implementation of the present disclosure.

According to an example implementation of the present disclosure, the mapping model described above can be represented in other manners. FIG. 5 schematically illustrates block diagram 500 of a mapping model according to an example implementation of the present disclosure. In FIG. 5, the horizontal coordinate represents scheduling time overheads and the vertical coordinate represents batch sizes for different task types. Specifically, mapping models 510 and 520 illustrate mapping models for the task type that requires high data throughput and for the task type that requires low response latency, respectively. It will be understood that Table 1 and FIG. 1 provide only examples of mapping models, and that according to an example implementation of the present disclosure, more task types can exist and a corresponding mapping model can be provided for each task type respectively. For example, another task type represents a balance between demands in two aspects, i.e., response latency and data throughput, and in this case, another line corresponding to that task type can be provided in FIG. 5 (e.g., a line segment through the coordinate points (0, 0) and (1200, 128)).

According to an example implementation of the present disclosure, the mapping model described above can be acquired based on a machine learning approach. For example, this mapping model can be trained using historical data labeled by technical experts. With the example implementation of the present disclosure, machine learning techniques can be used to accumulate historical knowledge of the association relationship between task types, scheduling time overheads of computing units, and batch sizes of multiple computing tasks in order to guide the future scheduling process of computing tasks.

According to an example implementation of the present disclosure, the batch size can be determined based on the task type, the scheduling time overhead, and the mapping model. In this way, the historical knowledge in the mapping model can be effectively used to determine the batch size in the computing system during its future operation, thereby improving the performance of the computing system and making it to better meet user demands.

Figure 6:
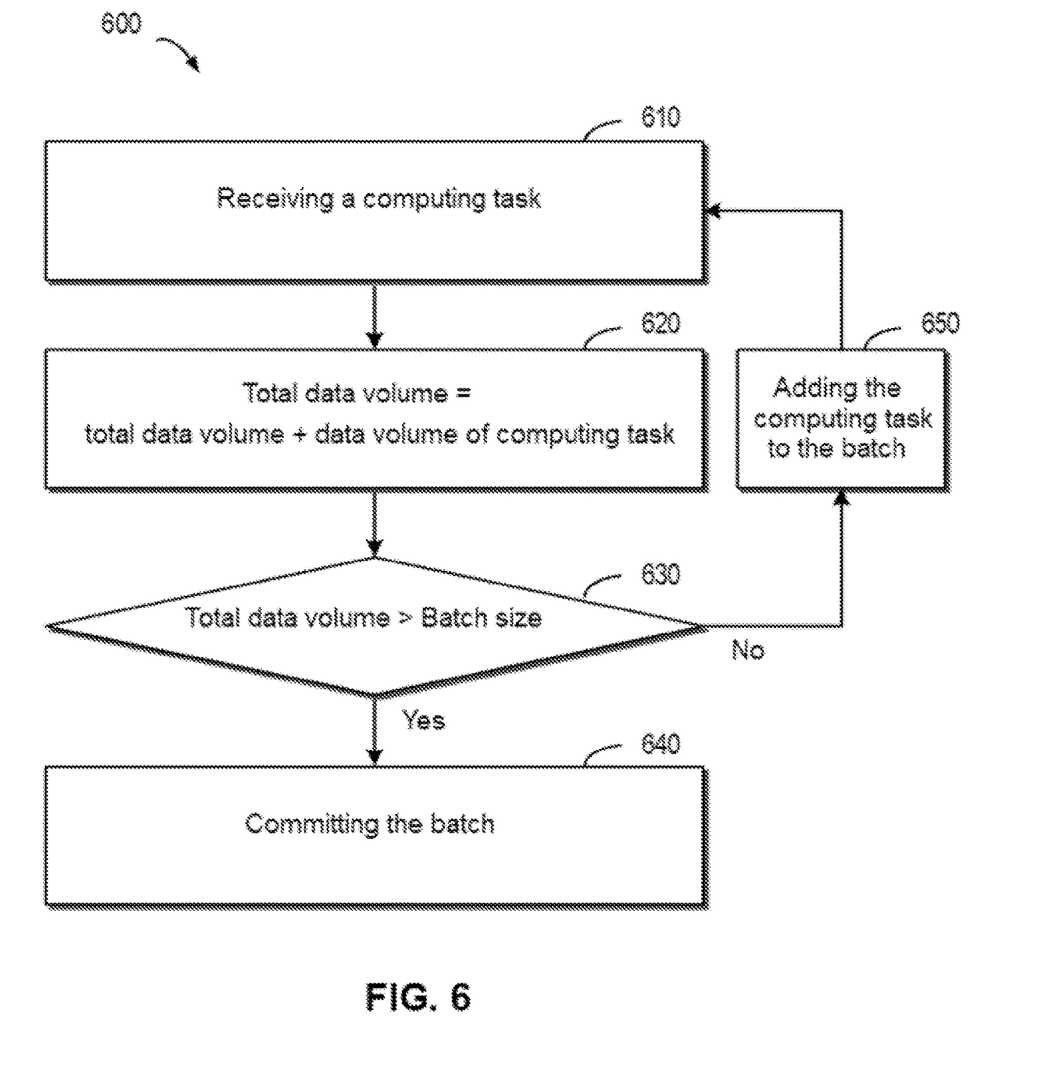
FIG. 6 schematically illustrates a flow chart of a method for determining a batch according to an example implementation of the present disclosure.

Return to FIG. 4 to describe more details about the subsequent processing based on batch size 340. At block 440 in FIG. 4, the multiple computing tasks are divided into at least one batch based on batch size 340. According to an example implementation of the present disclosure, the multiple computing tasks can first be classified based on the task type. Further, for multiple computing tasks with the same task type, the batches can be divided according to the corresponding batch size. The case where multiple computing tasks involve the same task type will be first described. A first computing task of the multiple computing tasks can be added to a batch. If the sum of the data volumes of computing tasks in this batch is not greater than the batch size, a second computing task following the first computing task in the multiple computing tasks is added to the batch. The above process can be repeated until the sum of the data volumes of the computing tasks in this batch is greater than batch size 340. FIG. 6 schematically illustrates a flow chart of method 600 for determining a batch according to an example implementation of the present disclosure.

At block 610, a computing task can be received. Multiple computing tasks can be received one after another and one computing task can be processed in each cycle. At block 620, the total data volume of each computing task in the batch can be updated based on the data volume of the received computing task, for example, the update operation can be performed based on the following equation: Total data volume =total data volume +data volume of computing task. At block 630, the relationship between the total data volume and the batch size can be determined. If the total data volume is not greater than the batch size, method 600 proceeds to block 650 in order to add the computing task to that batch. Following that, method 600 will return to block 610 in order to receive the next computing task.

It will be understood that the multiple computing tasks can be arranged in a specified queue, and if the queue is empty, then a new request to use the computing unit to perform another computing task can be awaited. After receiving a new request, the computing task defined by the new request can be added to the batch. The process described above can be repeated until the determination result at block 630 is "Yes."

At block 630, if the total data volume is greater than the batch size, method 600 proceeds to block 640 and commits the batch. In other words, if it is determined that the sum of the data volumes of the computing tasks in the batch is greater than the batch size, that batch is committed to computing unit 130 to cause computing unit 130 to perform the computing tasks in the committed batch. At this point, the computing tasks in the batch will be wrapped into a single data packet and occur to computing unit 130.

Hereinafter, the case in which multiple computing tasks involve different task types will be described. If it is determined that the multiple computing tasks involve different task types, a corresponding batch can be established for each task type respectively. The batch size associated with each task type can be determined respectively based on method 400 described above. Assuming an acquired scheduling time overhead to be 600 µs, the batch sizes corresponding to the two task types can be determined based on Table 1 to be 110 KB and 8 KB, respectively. In this case, the two types of computing tasks can be processed respectively according to the two batch sizes.

Specifically, the multiple computing tasks can be first classified into a first type requiring low response latency and a second type requiring high data throughput. The multiple computing tasks of both types can be divided into corresponding batches respectively. For example, for multiple computing tasks of the first type, the batches can be divided according to method 600, and at this point, the batch size is 110 KB. For another example, for multiple computing tasks of the second type, the batches can be divided according to method 600, and at this point, the batch size is 8 KB. With the example implementation of the present disclosure, corresponding batches can be generated respectively according to different user demands, and each corresponding batch can then be committed to computing unit 130 for execution. In this way, computing tasks can be processed based on user demands, and processing results can be made to meet user demands as much as possible in terms of both response latency and data throughput.

According to an example implementation of the present disclosure, method 400 can be executed periodically in the computing system. For example, a timer can be set and method 400 can be executed at a predetermined period (e.g., half an hour). In this manner, the most recent scheduling time overhead 320 can be continuously acquired, allowing batch size 340 to be determined in a more accurate manner. It will be understood that when there is a change in the workload in the computing system, the resource allocation, response speed, etc. of the computing system will change, which results in a potentially large change in scheduling time overhead 320. Thus, a change threshold (e.g., 20%) can be set in advance, and when the rate of change of the workload of the computing system is higher than this change threshold, method 400 described above is started. In this way, the latest scheduling time overhead can be acquired in a timely manner so that the batch size can be determined in a more accurate manner.

With the example implementation of the present disclosure, the batch size can be dynamically updated based on the current scheduling time overhead, thereby allowing the computing unit to process multiple computing tasks in accordance with the dynamically determined batch size. Further, the batch size is determined based on demands of different users for computing tasks (e.g., requiring low response latency or requiring high data throughput), and at this point, executing multiple computing tasks according to such a batch size can make the processing results meet the demands of different users.

It will be understood that while the method according to an example implementation of the present disclosure is described above using a data protection system as an example, alternatively or additionally, the above method can be performed in other computing systems. Although the method according to an example implementation of the present disclosure is described above using the QAT accelerator as an example of a computing unit, alternatively or additionally, the method described above can be performed for multiple computing tasks that will be processed by other computing units. For example, the method described above can be performed in a general computing system for multiple computing tasks to be performed by the CPU.

Examples of the method according to the present disclosure have been described in detail above with reference to FIGS. 2 to 6, and implementations of a corresponding apparatus will be described below. According to an example implementation of the present disclosure, an apparatus for managing multiple computing tasks on a batch basis is provided. This apparatus includes: an identifying module configured to identify a task type of the multiple computing tasks in response to receiving a request to use a computing unit in a computing system to perform the multiple computing tasks; an acquiring module configured to acquire a scheduling time overhead incurred for scheduling the multiple computing tasks for execution by the computing unit; a determining module configured to determine, based on the task type and the scheduling time overhead, a batch size for dividing the multiple computing tasks; and a dividing module configured to divide the multiple computing tasks into at least one batch based on the batch size. According to an example implementation of the present disclosure, this apparatus further includes modules for performing other steps in method 400 described above.

Figure 7:
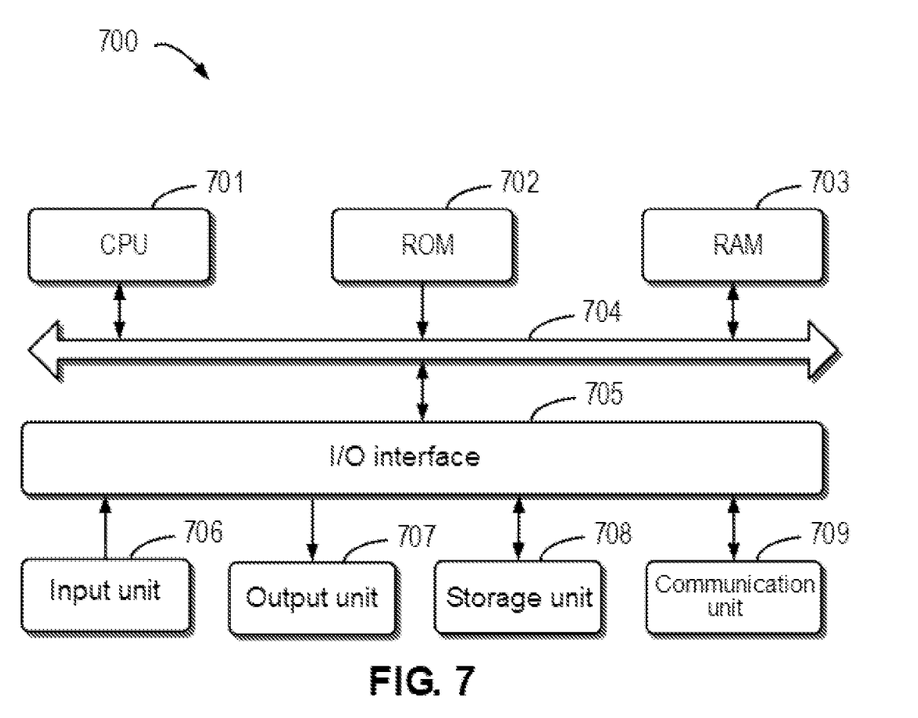
FIG. 7 schematically illustrates a block diagram of a device for managing computing tasks according to an example implementation of the present disclosure.

FIG. 7 schematically illustrates a block diagram of device 700 for managing computing tasks according to an example implementation of the present disclosure. As shown in the figure, device 700 includes central processing unit (CPU) 701 that may execute various appropriate actions and processing according to computer program instructions stored in read-only memory (ROM) 702 or computer program instructions loaded from storage unit 708 into random access memory (RAM) 703. In RAM 703, various programs and data required for the operation of storage device 700 may also be stored. CPU 701, ROM 702, and RAM 703 are connected to one another through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing procedures described above, such as method 400, may be performed by processing unit 701. For example, in some implementations, method 400 may be implemented as a computer software program that is tangibly included in a machine-readable medium, such as storage unit 708. In some implementations, part or all of the computer program may be loaded and/or installed onto device 700 via ROM 702 and/or communication unit 709. One or more steps of method 400 described above may be performed when the computer program is loaded into RAM 703 and executed by CPU 701. Alternatively, in other implementations, CPU 701 may also be configured in any other suitable manner to implement the above processes/methods.

According to an example implementation of the present disclosure, an electronic device is provided, including: at least one processor; a volatile memory; and a memory coupled to the at least one processor, wherein the memory has instructions stored therein that, when executed by the at least one processor, cause the device to perform a method for managing multiple computing tasks on a batch basis, including: identifying a task type of the multiple computing tasks in response to receiving a request to use a computing unit in a computing system to perform the multiple computing tasks; acquiring a scheduling time overhead incurred for scheduling the multiple computing tasks for execution by the computing unit; determining, based on the task type and the scheduling time overhead, a batch size for dividing the multiple computing tasks; and dividing the multiple computing tasks into at least one batch based on the batch size.

According to an example implementation of the present disclosure, identifying the task type includes identifying the task type based on at least any one of: throughput and response latency requirements for multiple tasks.

According to an example implementation of the present disclosure, determining the batch size includes: acquiring a mapping model corresponding to the task type, the mapping model describing an association relationship between the task type, the scheduling time overhead of the computing unit, and the batch size of the multiple computing tasks; and determining the batch size based on the task type, the scheduling time overhead, and the mapping model.

According to an example implementation of the present disclosure, acquiring the scheduling time overhead includes: acquiring the scheduling time overhead based on an operating state of the computing system.

According to an example implementation of the present disclosure, dividing the multiple computing tasks into the at least one batch includes: in response to determining that the multiple computing tasks involve the same task type, adding a first computing task of the multiple computing tasks to a batch of the at least one batch; and in response to determining that the sum of the data volumes of computing tasks in the batch is not greater than the batch size, adding to the batch a second computing task following the first computing task in the multiple computing tasks.

According to an example implementation of the present disclosure, the method further includes: waiting for another request to use the computing unit to perform another computing task; and adding the another computing task to the batch.

According to an example implementation of the present disclosure, the method further includes: in response to determining that the sum of the data volumes of computing tasks in the batch is greater than the batch size, committing the batch to the computing unit to cause the computing unit to perform the computing tasks in the committed batch.

According to an example implementation of the present disclosure, dividing the multiple computing tasks into the at least one batch includes: in response to determining that the multiple computing tasks involve different task types, setting a first batch and a second batch respectively based on a first batch size and a second batch size associated with a first task type and a second task type of the multiple computing tasks; and dividing the multiple computing tasks into the first batch and the second batch according to the first task type and the second task type.

According to an example implementation of the present disclosure, the device is started based on at least any one of: a change in the workload of the computing system; and a predetermined timer.

According to an example implementation of the present disclosure, the computing unit includes at least any one of a Quick Assist Technology accelerator and a central processing unit, the computing system includes a data protection system, and the multiple computing tasks include at least any one of the following tasks in the data protection system: a compression task, a decompression task, an encryption task, a decryption task, a hash task, a backup task, and a replication task.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when being executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of the blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method, including:
receiving a request to perform, using a computing system, a set of computing tasks;
identifying a task type associated with the set of computing tasks;
determining a scheduling time overhead associated with scheduling the set of computing tasks for execution, based at least in part on a difference between:
a length of time between committing a computing task of the set of computing tasks and obtaining a processing result for the computing task; and
a length of time during which the computing task is performed by the computing system;
determining, based on the task type and the scheduling time overhead, a batch size for the set of computing tasks;
dividing the set of computing tasks into at least one batch based on the batch size; and
as a result of dividing the set of computing tasks into at least one batch, executing the set of computing tasks.

2. The method according to claim 1, wherein identifying the task type is based on at least one of: throughput requirements or response latency requirements for the set of computing tasks.

3. The method according to claim 1, wherein determining the batch size includes:
acquiring a mapping model corresponding to the task type, the mapping model describing an association relationship between the task type, the scheduling time overhead of the computing system, and the batch size of the set of computing tasks; and
determining the batch size based on the task type, the scheduling time overhead, and the mapping model.

4. The method according to claim 1, wherein the scheduling time overhead is based at least in part on an operating state of the computing system.

5. The method according to claim 1, wherein dividing the set of computing tasks into the at least one batch includes:
adding a first computing task of the set of computing tasks to the at least one batch; and
in response to determining that a sum of data volumes of computing tasks in the batch is not greater than the batch size, adding a second computing task of the set of computing tasks to the at least one batch.

6. The method according to claim 5, further including:
receiving a second request to use the computing system to perform a third computing task of the set of computing tasks; and
adding the third computing task to the at least one batch.

7. The method according to claim 5, further including: in response to determining that the sum of the data volumes of computing tasks in the at least one batch is greater than the batch size, committing the at least one batch to the computing system to cause the computing system to perform the set of computing tasks in the at least one batch.

8. The method according to claim 1, further including:
in response to determining that the set of computing tasks comprises a plurality of task types, creating a second batch, the second batch having a second batch size and associated with a second task type, the second task type different than that of the at least one batch; and
dividing the set of computing tasks into the at least one batch and the second batch based at least in part on the plurality of task types.

9. The method according to claim 1, wherein the method is performed based on at least one of:
a change in a workload of the computing system; or a predetermined timer.

10. The method according to claim 1, wherein the computing system includes at least one of a Quick Assist Technology accelerator and a central processing unit, the computing system includes a data protection system, and the set of computing tasks in the data protection system includes at least one of: a compression task, a decompression task, an encryption task, a decryption task, a hash task, a backup task, or a replication task.

11. An electronic device, including:
at least one processor; and
a memory coupled to the at least one processor, wherein the memory has instructions stored therein that, when executed by the at least one processor, cause the at least one processor to perform a method, the method including:
receiving a request to perform, using a computing system, a set of computing tasks;
identifying a task type associated with the set of computing tasks;
determining a scheduling time overhead associated with scheduling the set of computing tasks for execution, based at least in part on a difference between:

a length of time between committing a computing task of the set of computing tasks and obtaining a processing result for the computing task; and a length of time during which the computing task is performed by the computing system;

determining, based on the task type and the scheduling time overhead, a batch size for the set of computing tasks;

dividing the set of computing tasks into at least one batch based on the batch size; and as a result of dividing the set of computing tasks into at least one batch, executing the set of computing tasks.

12. The device according to claim 11, wherein identifying the task type is based on at least one of: throughput requirements or response latency requirements for the set of tasks.

13. The device according to claim 11, wherein determining the batch size includes:

acquiring a mapping model corresponding to the task type, the mapping model describing an association relationship between the task type, the scheduling time overhead of the computing system, and the batch size of the set of computing tasks; and determining the batch size based on the task type, the scheduling time overhead, and the mapping model.

14. The device according to claim 11, wherein the scheduling time overhead is based at least in part on an operating state of the computing system.

15. The device according to claim 11, wherein dividing the set of computing tasks into the at least one batch includes:

adding a first computing task of the set of computing tasks to the at least one batch; and in response to determining that a sum of data volumes of computing tasks in the batch is not greater than the batch size, adding a second computing task of the set of computing tasks to the at least one batch.

16. The device according to claim 15, wherein the method further includes:

receiving a second request to use the computing system to perform a third computing task of the set of computing tasks; and adding the third computing task to the at least one batch.

17. The device according to claim 15, wherein the method further includes: in response to determining that the sum of the data volumes of computing tasks in the at least one batch is greater than the batch size, committing the at least one batch to the computing system to cause the computing system to perform the set of computing tasks in the at least one batch.

18. The device according to claim 11, further including:

in response to determining that the set of computing tasks comprises a plurality of task types, a second batch, the second batch having a second batch size and associated with a second task type, the second task type different than that of the at least one batch; and dividing the set of computing tasks into the at least one batch and the second batch based at least in part on the plurality of task types.

19. The device according to claim 11, wherein:

the device is started based on at least one of: a change in a workload of the computing system; or a predetermined timer; and the computing system includes at least one of a Quick Assist Technology accelerator and a central processing unit, the computing system includes a data protection system, and the set of computing tasks in the data protection system includes at least one of: a compression task, a decompression task, an encryption task, a decryption task, a hash task, a backup task, or a replication task.

20. A non-transitory computer-readable medium including instructions, which when executed by a processor, cause the processor to perform a method, the method comprising:

receiving a request to perform, using the processor, a set of computing tasks;

identifying a task type associated with the set of computing tasks;

determining a scheduling time overhead associated with scheduling the set of computing tasks for execution, based at least in part on a difference between:

a length of time between committing a computing task of the set of computing tasks and obtaining a processing result for the computing task; and a length of time during which the computing task is performed by the processor;

determining, based on the task type and the scheduling time overhead, a batch size for the set of computing tasks;

dividing the set of computing tasks into at least one batch based on the batch size; and as a result of dividing the set of computing tasks into at least one batch, executing the set of computing tasks.

* * * * *